US012533297B2

(12) United States Patent
Shemesh

(10) Patent No.: US 12,533,297 B2
(45) Date of Patent: Jan. 27, 2026

(54) SYRINGE ADAPTOR WITH ELASTOMERIC SEPTUM

(71) Applicant: SIMPLIVIA HEALTHCARE LTD., Kiryat Shmona (IL)

(72) Inventor: Eli Shemesh, Hod Hasharon (IL)

(73) Assignee: SIMPLIVIA HEALTHCARE LTD., Kiryat Shmona (IL)

( * ) Notice: Subject to any disclaimer, the term of this patent is extended or adjusted under 35 U.S.C. 154(b) by 787 days.

(21) Appl. No.: 17/581,925

(22) Filed: Jan. 23, 2022

(65) Prior Publication Data

US 2022/0142868 A1 May 12, 2022

Related U.S. Application Data

(62) Division of application No. 16/057,832, filed on Aug. 8, 2018, now Pat. No. 11,266,571.

(60) Provisional application No. 62/543,387, filed on Aug. 10, 2017.

(51) Int. Cl.

| | |
|---|---|
| ***A61J 1/20*** | (2006.01) |
| ***A61J 1/10*** | (2006.01) |
| *A61J 1/14* | (2023.01) |

(52) U.S. Cl.

CPC ............... *A61J 1/2096* (2013.01); *A61J 1/10* (2013.01); *A61J 1/20* (2013.01); *A61J 1/1406* (2013.01); *A61J 1/201* (2015.05); *A61J 1/2055* (2015.05)

(58) Field of Classification Search

CPC ........ A61J 1/2096; A61J 1/1406; A61J 1/201; A61J 1/2055

See application file for complete search history.

(56) References Cited

U.S. PATENT DOCUMENTS

| | | | | |
|---|---|---|---|---|
| 9,039,047 B2 * | 5/2015 | Imai | A61J 1/2096 | 285/402 |
| 9,877,895 B2 * | 1/2018 | Garfield | A61M 5/31 | |
| 2015/0013837 A1 * | 1/2015 | Barrelle | A61J 1/201 | 141/330 |
| 2015/0297459 A1 * | 10/2015 | Sanders | A61J 1/2065 | 604/414 |
| 2018/0153771 A1 * | 6/2018 | Lewkonya | A61M 5/345 | |
| 2019/0060170 A1 * | 2/2019 | Kriheli | A61J 1/20 | |

* cited by examiner

*Primary Examiner* — Ariana Zimbouski

(74) *Attorney, Agent, or Firm* — FisherBroyles, LLP; Roger L. Browdy; James E. Mrose

(57) ABSTRACT

A syringe adaptor includes a body, shaped to define a body lumen, a syringe fitting at a proximal end of the body, configured to connect to a distal end of a syringe, a needle extending distally from the syringe fitting into the body lumen, a septum housing, and an elastomeric septum mounted inside the septum housing. The septum includes a proximal face, shaped to define an aperture having an aperture diameter, and a distal face. The septum is shaped to define a cavity, joined to the aperture, having a cavity diameter that is larger than the aperture diameter. The septum housing is configured to slide proximally within the body lumen such that a distal end of the needle contained in the cavity passes through the distal face of the septum. Other embodiments are also described.

7 Claims, 8 Drawing Sheets

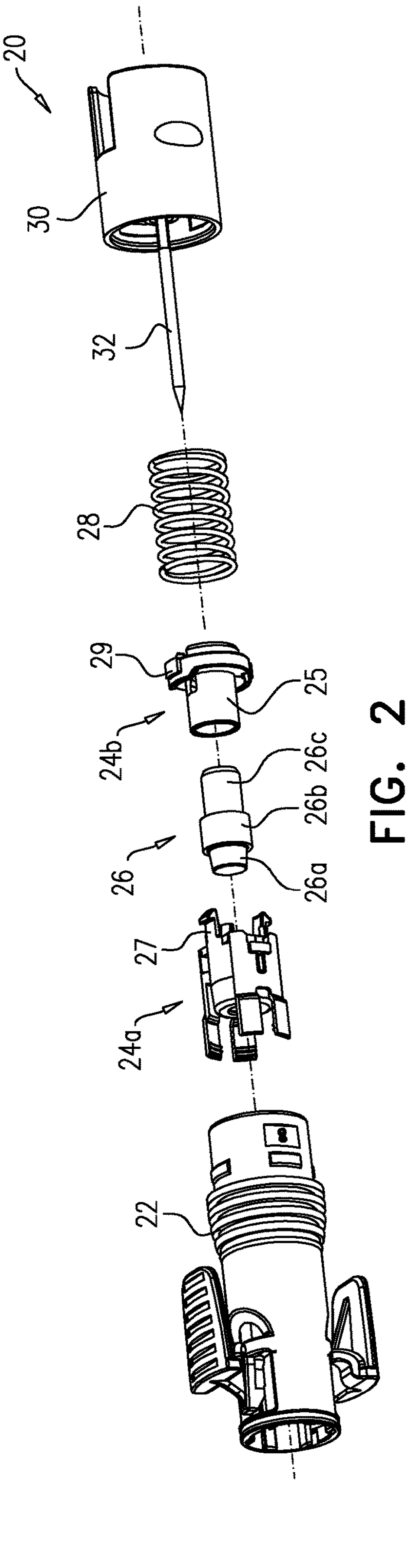
FIG. 2
FIG. 3
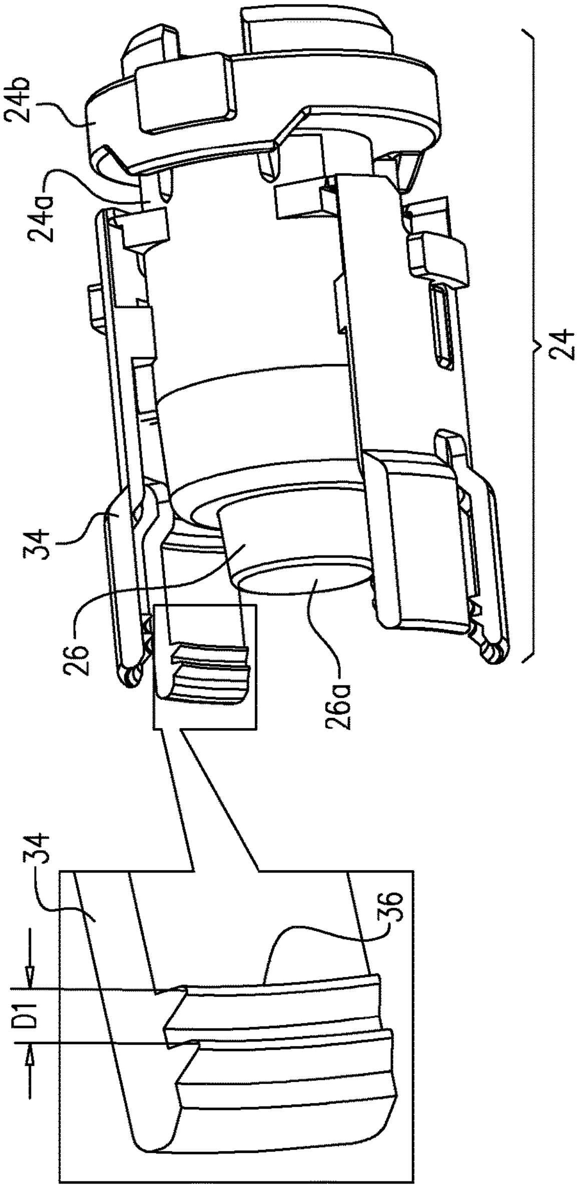

SYRINGE ADAPTOR WITH ELASTOMERIC SEPTUM

CROSS-REFERENCE TO RELATED APPLICATIONS

The present application is a divisional of U.S. application Ser. No. 16/057,832, filed Aug. 8, 2018, entitled "Syringe adaptor and complementary fluid-port adaptor," whose disclosure is incorporated herein by reference, which claims the benefit of U.S. Provisional Application No. 62/543,387, entitled "Syringe adaptor and complementary fluid-port adaptor," filed Aug. 10, 2017, whose disclosure is incorporated herein by reference.

FIELD OF THE INVENTION

The present invention relates generally to the field of medical devices, and specifically to adaptors used to facilitate the transfer of fluids to and from a syringe.

BACKGROUND

U.S. Pat. No. 7,670,326 describes a syringe adapter element for use in a drug mixing system, including a housing element having a syringe port adapted for fluid connection with a syringe and a fluid port adapted for fluid connection with a fluid flow adapter element, a needle and at least one septum disposed in the housing element, the needle having a sealed orientation wherein the at least one septum blocks fluid flow through the needle and a fluid flow orientation wherein the needle punctures the at least one septum so as to permit fluid to flow through the needle, and an anti-separation device adjacent the fluid port, such that when the syringe adapter element is connected to a fluid flow adapter element, the anti-separation device applies a force that acts against separating the syringe adapter element from the fluid flow adapter element.

PCT Publication WO/2008/129550 describes a method that allows contamination-free transfer of a liquid from one container to another and devices including embodiments of a transfer apparatus and adaptors that are used to carry out the method. By contamination-free transfer of liquid it is meant that during the transfer process there is no leakage of the liquid or air contaminated by the liquid or vapors of the liquid to the surroundings and also that no contaminants from the surroundings come into contact with the liquid. The disclosure is particularly directed towards providing an apparatus that is adapted to effect contamination-free transfer of a hazardous drug to and from any container equipped with a standard connector port.

U.S. Pat. No. 8,122,923, whose disclosure is incorporated herein by reference, describes a drug mixing system including at least one receptacle port adaptor adapted to be inserted into a port of a fluid receptacle, at least one syringe adaptor adapted to be attached to a syringe and to the at least one receptacle port adaptor and at least one vial adaptor adapted for connection to a vial containing a drug and adapted for connection to the at least one syringe adaptor, the system being characterized in that at least one of the receptacle port adaptor, the at least one syringe adaptor and the at least one vial adaptor being vented to the atmosphere in a manner which prevents release to the atmosphere of possibly harmful contents of the vial in a liquid, solid or gaseous form.

PCT Publication WO/2016/199133 describes changes to components of fluid transfer apparatuses comprising a first component, e.g. a syringe, a connector component configured to connect between the first component and an adapter component that is configured to allow connection of the connector component to a second component of the drug transfer apparatus, e.g. to a drug vial. The changes include, inter alia, changes to the sealing elements that seal the proximal end of the syringe, redesign of a septum holder inside the connector component and corresponding redesign of the housing of the connector component; changes to the structure of the end of the connector component that connects to the first component to allow the first component to swivel relative to the connector component; and changes to the design of the adapter component to a second component of the drug transfer apparatus to allow it to mate with the redesigned housing of the connector component.

PCT Publication WO/2016/147178 describes embodiments of septum holders for use in syringe connectors that are used to connect syringes to other elements of liquid transfer apparatuses. The septum holders comprise a septum holder body, at least one resilient elongated arm that terminates with a distal enlarged element attached to the sides of the body, and a septum. The septum holders of the invention are characterized in that they comprise at least one bore that is created in the septum or in an insert fixed in either the body of the septum holder or in the septum that functions as the seat of a needle valve and in that the septum is attached to the bottom of the body of the septum holder projecting downwards parallel to the at least one elongated arm.

SUMMARY OF THE INVENTION

There is provided, in accordance with some embodiments of the present invention, a syringe adaptor for use with a fluid-port adaptor having an outer surface that is shaped to define one or more circumferential ridges. The syringe adaptor includes a body, shaped to define a body lumen having a variable radius that is larger at a distal portion of the body lumen than at a more proximal portion of the body lumen. The syringe adaptor further includes a syringe fitting at a proximal end of the body, configured to connect to a distal end of a syringe, a needle extending distally from the syringe fitting into the body lumen, and a septum housing slidably disposed within the body lumen. The septum housing includes a plurality of distally-extending, radially-flexible legs, each of the legs being shaped to define a series of teeth that protrude radially inward, and being configured to flex radially inward upon entering the more proximal portion of the body lumen such that the teeth are releasably lockable onto the circumferential ridges. The syringe adaptor further includes a septum, mounted inside the septum housing.

In some embodiments, a distal portion of an inside wall of the body is shaped to define a plurality of grooves, the variable radius being larger at the distal portion of the body lumen by virtue of the grooves.

In some embodiments, the legs of the septum housing are aligned with respective ones of the grooves.

In some embodiments, an inside wall of the body is shaped to define a plurality of grooves having a variable depth that is larger at a distal portion of the inside wall than at a more proximal portion of the inside wall, the variable radius being larger at the distal portion of the body lumen by virtue of the variable depth of the grooves.

In some embodiments, the legs of the septum housing are disposed within respective ones of the grooves.

In some embodiments, when the legs are inside the distal portion of the body lumen, a distal opening of the needle is disposed proximally to at least a distal face of the septum.

In some embodiments, when the legs are inside the distal portion of the body lumen, the distal opening of the needle is disposed inside of the septum.

In some embodiments, when the legs are inside at least part of the more proximal portion of the body lumen, the distal opening of the needle is disposed distally to a distal face of the septum.

In some embodiments, the legs are configured to expand radially outward upon entering the distal portion of the body lumen from the more proximal portion of the body lumen, such that the teeth become unlocked from the circumferential ridges.

In some embodiments, the syringe adaptor further includes a spring disposed within the body lumen between the syringe fitting and the septum housing, the spring being configured to bias the septum housing distally so as to facilitate locking of the teeth onto the circumferential ridges.

In some embodiments, each of the teeth is angled in a proximal direction.

In some embodiments, a distance between successive ones of the teeth is less than 1 mm.

In some embodiments, the series of teeth includes at least three teeth.

In some embodiments, the series of teeth consists of two teeth.

There is further provided, in accordance with some embodiments of the present invention, a vial adaptor for use with a syringe adaptor that includes a septum housing, the septum housing including a plurality of distally-extending, radially-flexible legs, each of the legs being shaped to define one or more teeth that protrude radially inward. The vial adaptor includes a syringe-adaptor connecting portion at a front of the vial adaptor. The syringe-adaptor connecting portion includes a cylindrical septum housing having an outer surface shaped to define a series of circumferential ridges, the circumferential ridges being configured to be releasably connectable to the syringe adaptor by virtue of the teeth releasably locking onto the circumferential ridges. The syringe-adaptor connecting portion further includes a septum, disposed at an opening of the septum housing so as to resiliently seal the opening, and a vial connecting portion disposed behind the syringe-adaptor connecting portion. The vial connecting portion includes a rearwardly-extending hollow spike configured to couple the vial adaptor to a vial by piercing a vial closure disposed at an opening of the vial. The syringe-adaptor connecting portion and the vial connecting portion are collectively shaped to define a passage extending from the hollow spike to the opening of the septum housing, so as to allow fluid flow between the spike and the opening of the septum housing.

In some embodiments, the vial connecting portion further includes a circumferential arrangement of leaves surrounding the spike, the leaves being configured to connect the vial adaptor to the vial by grasping the vial.

In some embodiments, the leaves are configured to non-releasably connect the vial adaptor to the vial by grasping the vial.

In some embodiments, the spike is parallel to a vector that is normal to the opening of the septum housing.

In some embodiments, each of the circumferential ridges is angled away from the opening of the septum housing.

In some embodiments, the series of circumferential ridges includes at least three circumferential ridges.

In some embodiments, a distance between successive ones of the circumferential ridges is less than 1 mm.

In some embodiments, the syringe adaptor further includes a plurality of tabs, and the syringe-adaptor connecting portion is shaped to define a ledge located behind the circumferential ridges, the ledge being configured to receive the tabs during connection of the vial adaptor to the syringe adaptor.

There is further provided, in accordance with some embodiments of the present invention, a system that includes a syringe adaptor and a fluid-port adaptor. The syringe adaptor includes a body, shaped to define a body lumen having a variable radius that is larger at a distal portion of the body lumen than at a more proximal portion of the body lumen, a syringe fitting at a proximal end of the body, configured to connect to a distal end of a syringe, and a needle extending distally from the syringe fitting into the body lumen. The syringe adaptor further includes a syringe adaptor septum housing slidably disposed within the body lumen, the syringe adaptor septum housing including a plurality of distally-extending, radially-flexible legs, each of the legs being shaped to define one or more teeth that protrude radially inward. The syringe adaptor further includes a septum, mounted inside the syringe adaptor septum housing. The fluid-port adaptor includes a fluid-port connecting portion, configured to connect the fluid-port adaptor to a fluid-port, and a syringe-adaptor connecting portion. The syringe-adaptor connecting portion includes a cylindrical septum housing having an outer surface shaped to define a series of circumferential ridges, the circumferential ridges being configured to releasably connect the fluid-port adaptor to the syringe adaptor by virtue of the teeth releasably locking onto the circumferential ridges when the legs are inside the more proximal portion of the body lumen, and a septum, disposed at an opening of the cylindrical septum housing so as to resiliently seal the opening. The fluid-port adaptor is shaped to define a passage extending from the fluid-port connecting portion to the syringe-adaptor connecting portion so as to allow fluid flow between the fluid-port connecting portion and the syringe-adaptor connecting portion.

There is further provided, in accordance with some embodiments of the present invention, a system that includes a syringe adaptor and a fluid-port adaptor. The syringe adaptor includes a body, shaped to define a body lumen having a variable radius that is larger at a distal portion of the body lumen than at a more proximal portion of the body lumen, a syringe fitting at a proximal end of the body, configured to connect to a distal end of a syringe, and a needle extending distally from the syringe fitting into the body lumen. The syringe adaptor further includes a syringe adaptor septum housing slidably disposed within the body lumen, the syringe adaptor septum housing including a plurality of distally-extending, radially-flexible legs, each of the legs being shaped to define a series of teeth that protrude radially inward. The syringe adaptor further includes a septum, mounted inside the syringe adaptor septum housing. The fluid-port adaptor includes a fluid-port connecting portion, configured to connect the fluid-port adaptor to a fluid-port, and a syringe-adaptor connecting portion. The syringe-adaptor connecting portion includes a cylindrical septum housing having an outer surface shaped to define one or more circumferential ridges, the circumferential ridges being configured to releasably connect the fluid-port adaptor to the syringe adaptor by virtue of the teeth releasably locking onto the circumferential ridges when the legs are inside the more proximal portion of the body lumen, and a septum, disposed at an opening of the cylindrical septum housing so as to resiliently seal the opening. The fluid-port adaptor is shaped to define a passage extending from the fluid-port connecting portion to the syringe-adaptor connecting portion so as to allow fluid flow between the fluid-port connecting portion and the syringe-adaptor connecting portion.

There is further provided, in accordance with some embodiments of the present invention, a fluid-port adaptor for use with a syringe adaptor that includes a septum housing, the septum housing including a plurality of distally-extending, radially-flexible legs, each of the legs being shaped to define one or more teeth that protrude radially inward. The fluid-port adaptor includes a fluid-port connecting portion, configured to connect the fluid-port adaptor to a fluid-port, and a syringe-adaptor connecting portion. The syringe-adaptor connecting portion includes a cylindrical septum housing having an outer surface shaped to define a series of circumferential ridges, the circumferential ridges being configured to releasably connect the fluid-port adaptor to the syringe adaptor by virtue of the teeth releasably locking onto the circumferential ridges, and a septum, disposed at an opening of the septum housing so as to resiliently seal the opening. The fluid-port adaptor is shaped to define a passage extending from the fluid-port connecting portion to the syringe-adaptor connecting portion so as to allow fluid flow between the fluid-port connecting portion and the syringe-adaptor connecting portion.

In some embodiments, the fluid-port connecting portion includes a spike that is configured to couple the fluid-port adaptor to the fluid port by piercing a closure disposed at an opening of the fluid port.

In some embodiments, the fluid-port connecting portion includes a cylindrical tube configured to connect the fluid-port adaptor to the fluid port by passing over the fluid port.

In some embodiments, the fluid-port connecting portion includes a cylindrical tube configured to connect the fluid-port adaptor to the fluid port by passing into the fluid port.

In some embodiments, each of the circumferential ridges is angled away from the opening of the septum housing.

In some embodiments, the series of circumferential ridges includes at least three circumferential ridges.

In some embodiments, a distance between successive ones of the circumferential ridges is less than 1 mm.

In some embodiments, the fluid port is selected from the group consisting of: a fluid port of an intravenous (IV) bag, a fluid port of a vial, and a fluid port of an IV cannula.

There is further provided, in accordance with some embodiments of the present invention, a syringe adaptor. The syringe adaptor includes a body, shaped to define a body lumen, a syringe fitting at a proximal end of the body, configured to connect to a distal end of a syringe, a needle extending distally from the syringe fitting into the body lumen, and a septum housing. The syringe adaptor further includes an elastomeric septum mounted inside the septum housing, the septum including a proximal face, shaped to define an aperture having an aperture diameter, and a distal face. The septum is shaped to define a cavity, joined to the aperture, having a cavity diameter that is larger than the aperture diameter. The septum housing is configured to slide proximally within the body lumen such that a distal end of the needle contained in the cavity passes through the distal face of the septum.

In some embodiments, the cavity extends at least 5 mm from the proximal face of the septum.

In some embodiments, the distal face of the septum is disposed at least 7 mm from the proximal face of the septum.

In some embodiments, the aperture diameter is less than 1.5 mm.

In some embodiments, the cavity diameter is greater than 0.8 mm.

In some embodiments, the cavity diameter is 0.3-0.7 mm greater than a needle diameter of the needle.

The present invention will be more fully understood from the following detailed description of embodiments thereof, taken together with the drawings, in which:

BRIEF DESCRIPTION OF THE DRAWINGS

FIG. 2 is a schematic exploded view of a syringe adaptor, in accordance with some embodiments of the present invention;

FIG. 3 is a schematic illustration of a septum housing holding a septum, in accordance with some embodiments of the present invention;

DETAILED DESCRIPTION OF EMBODIMENTS

Overview

Figure 1:
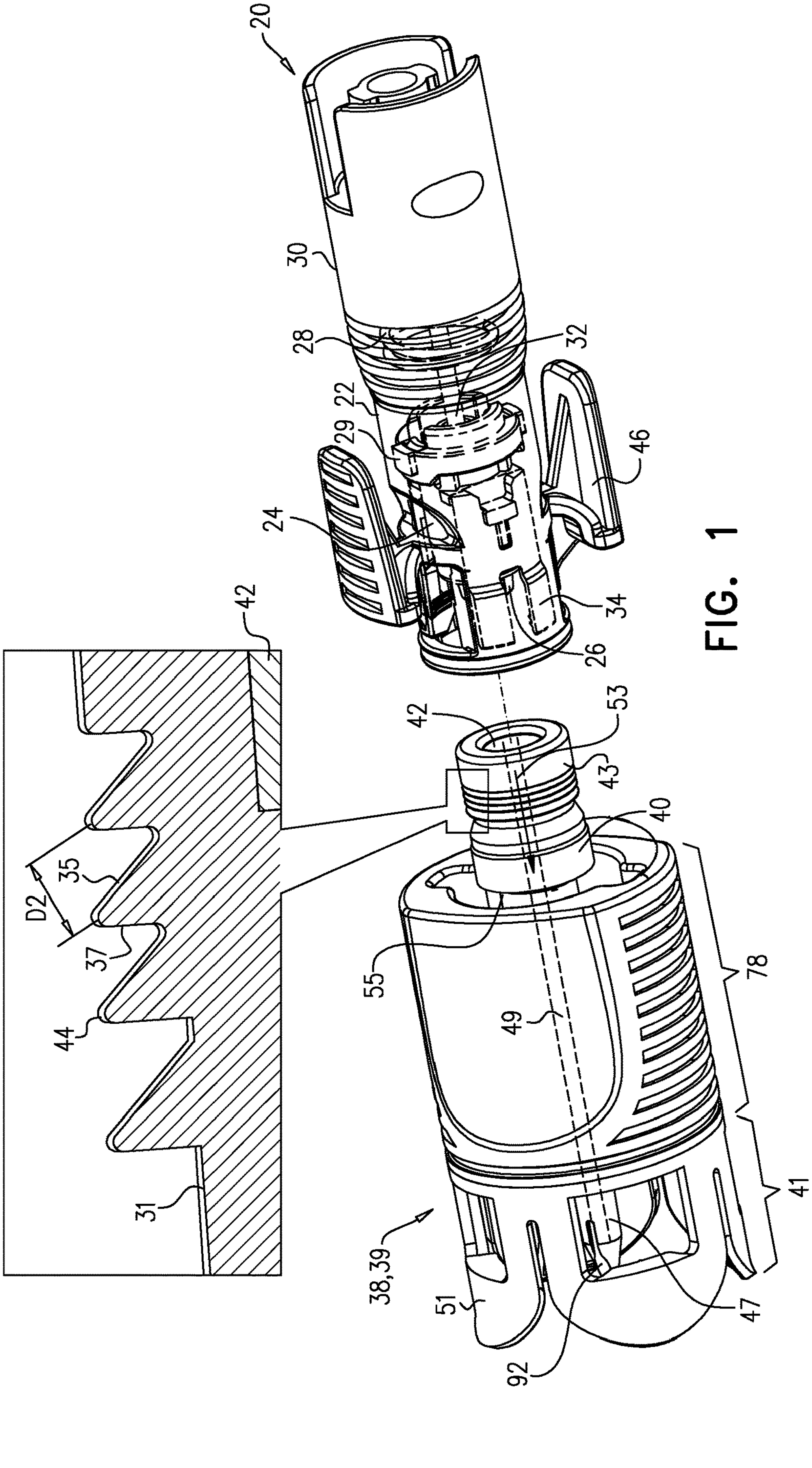
FIG. 1 is a schematic illustration of a system comprising a syringe adaptor and a complementary fluid-port adaptor, in accordance with some embodiments of the present invention.

Various medical applications call for the use of a syringe to transfer a fluid to or from a container. For example, in some applications, a syringe is used to draw fluid from a fluid reservoir, to pass the fluid into a vial that contains a powdered drug, and then, following the mixing of the fluid with the powdered drug to form a solution, to draw the solution from the vial.

When used for such applications, the distal end of the syringe is attached, via a Luer fitting or other fitting, to a needle, which is shaped to define a lumen through which the fluid may pass. To transfer fluid to or from a container, such as a fluid reservoir or vial, the needle is first passed through a fluid port of the container. Next, the plunger of the syringe is advanced or withdrawn, as appropriate, such as to transfer the fluid to or from the container. Finally, the needle is removed from the fluid port.

A challenge, when performing a fluid transfer as described above, is that exposure of the distal end of the needle may pose a hazard to the user, e.g., due to possible leakage of fluid from the opening of the needle. Embodiments described herein address this challenge, by providing a fluid-port adaptor and a complementary syringe adaptor that comprises the needle, which together inhibit exposure of the distal end of the needle.

Before transferring fluid between a syringe and a container, the syringe adaptor is coupled to the distal end of the syringe, such that fluid communication is established between the syringe and the needle, and the fluid-port adaptor is coupled to the fluid port of the container, such that fluid communication is established between the container and the fluid-port adaptor. Subsequently, the syringe adaptor is coupled to the fluid-port adaptor. The act of coupling the syringe adaptor to the fluid-port adaptor causes the needle to pass into the fluid-port adaptor, such that fluid communication is established between the needle and the container. Subsequently, following the transfer of fluid via the needle, the syringe adaptor remains coupled to the fluid-port adaptor while the needle is withdrawn from the container, such that the distal end of the needle remains unexposed throughout the withdrawal of the needle.

Typically, the syringe adaptor described herein comprises a syringe-adaptor body, shaped to define a body lumen having a variable radius that is larger at a distal portion of the body lumen than at a more proximal portion of the body lumen, and a syringe fitting at the proximal end of the syringe-adaptor body, the needle extending distally from the syringe fitting into the body lumen. The syringe adaptor further comprises a septum housing configured to slide, longitudinally, within the body lumen. The septum housing comprises a plurality of distally-extending, radially-flexible legs. Before the syringe adaptor is coupled to the fluid-port adaptor, these legs are positioned within the distal portion of the body lumen, where the legs extend to a radius that is greater than that of (i) the septum housing of the fluid-port adaptor, which is to be inserted into the body lumen, and (ii) the more proximal portion of the body lumen.

To couple the syringe adaptor with the fluid-port adaptor and simultaneously advance the needle into the fluid-port adaptor, the septum housing of the fluid-port adaptor is inserted into the body lumen, and a septum at the opening of this septum housing is pushed against another septum that is mounted inside the septum housing of the syringe adaptor. This pushing action causes the septum housing of the syringe adaptor to slide proximally within the body lumen, such that the radially-flexible legs enter the smaller-radius portion of the body lumen, and are thus pushed radially inward. As the legs are pushed radially inward, the legs grasp the septum housing of the fluid-port adaptor, as described in detail below. The proximal pushing of the septum housing of the syringe adaptor further causes the needle to pass through the distal face of the syringe-adaptor septum and through the fluid-port-adaptor septum, such that fluid may subsequently be transferred via the needle.

Subsequently, following the transfer of fluid, the complementary adaptors are pulled away from one another. This pulling action causes the septum housing (along with the septum housing of the fluid-port adaptor) to slide distally within the body lumen, while the legs continue to grasp the septum housing of the fluid-port adaptor. The legs release the septum housing of the fluid-port adaptor only upon reaching the larger-radius distal portion of the body lumen, at which point the distal end of the needle is safely contained within or proximally to the syringe-adaptor septum.

Advantageously, the legs may grasp the fluid-port adaptor such that the fluid-port-adaptor septum remains tightly pressed against the syringe-adaptor septum, thus inhibiting leakage of fluid from between the septa. For example, the septum housing of the fluid-port adaptor may be shaped to define a plurality of circumferential (e.g., circular) ridges, and each of the legs may be shaped to define one or more teeth configured to slide distally, but not proximally, over the ridges. As the septum housing of the syringe adaptor is proximally pushed within the smaller-radius portion of the body lumen, a spring disposed within the body lumen proximally to the septum housing applies a counterforce to the septum housing. This counterforce causes the teeth to slide distally along the ridges, until the two septa are tightly pressed against one another. The teeth then remain interlocked with the ridges, until the legs return to the larger-radius distal portion of the body lumen.

Embodiments described herein also include a particular septum for mounting inside the septum housing of the syringe adaptor. This septum comprises a proximal face shaped to define an aperture having a resting diameter that is less than that of the needle, such that the needle fittingly slides through the aperture. The septum further comprises a relatively long cavity joined to the aperture. The cavity is configured to contain the distal end of the needle (or at least the distal opening of the needle), along with any fluid that might escape from the needle, when the syringe adaptor is not coupled to the fluid-port adaptor. Moreover, typically, the septum provides an airtight seal around the needle opening, such that a user may be inhibited from pushing the plunger of the syringe when the syringe adaptor is not coupled to the fluid-port adaptor. Advantageously, the cavity is relatively wide, such that relatively little friction is generated by the sliding of the needle through the septum.

Before transferring fluid to or from the syringe, the needle first pierces the distal face of the septum. (For example, as described above, the needle may pierce the distal face of the septum by virtue of the proximal pushing of the septum housing of the syringe adaptor.) Subsequently, following the transfer of fluid, the needle slides proximally through the septum, until the distal end of the needle (or at least the distal opening of the needle) is disposed within the cavity of the septum. (For example, as described above, the needle may slide proximally through the septum by virtue of the distal sliding of the septum housing of the syringe adaptor within the body lumen.) The distal face of the septum then recloses, due to the elasticity of the septum, while, at the other end of the septum, the needle remains tightly contained by the proximal-face aperture. There is thus little chance of any fluid leaking from the septum, and, moreover, an airtight seal around the needle may be maintained.

Glossary

The term "septum," as used herein, may refer to a resilient structure. A septum may comprise one or more walls or membranes that may be used to divide one compartment from another compartment.

The term "lumen" may refer to any duct, cavity, or other hollow space, or to a plurality of conjoined hollow spaces. A lumen may have any suitable cross-sectional shape.

The terms "proximal" and "distal" are used to describe the relative positions of elements of the syringe adaptor, with reference to the point of view of the syringe to which the syringe adaptor is coupled. For example, a first element of the syringe adaptor that is closer to the syringe than a second element of the syringe adaptor is said to be more proximal than the second element of the syringe adaptor. So as not to cause any confusion, terms such as "front," "rear," and "behind," rather than the terms "proximal" and "distal," are used to describe the relative positions of elements of the fluid-port adaptor. The portion of the fluid-port adaptor that couples with the syringe adaptor is said to be at the "front" of the fluid-port adaptor, while the portion of the fluid-port adaptor that couples with the relevant fluid port is said to be at the "rear" of the fluid-port adaptor, "behind" (i.e., directly behind, or behind and off to the side from) the front of the fluid-port adaptor.

System Description

Reference is initially made to FIG. 1, which is a schematic illustration of a system 21 comprising a syringe adaptor 20 and a complementary fluid-port adaptor 38, in accordance with some embodiments of the present invention.

Syringe adaptor 20 comprises a body 22, shaped to define a body lumen. In FIG. 1, body 22 is transparent, so as to show various elements of the syringe adaptor disposed within the body lumen. These elements include a septum housing 24, which is slidably disposed within the body lumen, and a septum 26, which is mounted within septum housing 24. As further described below with reference to FIG. 3, septum housing 24 typically comprises a plurality of distally-extending, radially-flexible legs 34, each of which is shaped to define one or more, such as a series of two, three, or more, teeth that protrude radially inward from the legs.

Syringe adaptor 20 further comprises a syringe fitting 30 coupled to body 22 at the proximal end of the body. Syringe fitting 30, which may comprise, for example, a Luer fitting, is configured to connect, releasably or non-releasably, to the distal end of a syringe. A needle 32, which is shaped to define a needle lumen, extends distally from the syringe fitting into the lumen of body 22, such that the connection of the syringe fitting to the syringe establishes fluid communication between the needle and the syringe. Needle 32 may comprise a metal, a plastic, and/or any other suitable material. Needle 32 may be a standard hypodermic needle, as known in the art.

In some embodiments, syringe adaptor 20 further comprises a spring 28, disposed at the proximal end of the body lumen between the syringe fitting and the septum housing. As shown, needle 32 typically passes through spring 28.

Prior to the coupling of the syringe adaptor with the fluid-port adaptor, the distal end of the needle is disposed within, or proximally to, septum 26. The act of coupling the syringe adaptor to the fluid-port adaptor, however, causes needle 32 to pass through septum 26, and through another septum 42 disposed at the opening of the fluid-port adaptor. Fluid may then be transferred, via the needle, through the fluid port, by retracting or advancing the plunger of the syringe.

In the particular embodiment shown in FIG. 1, fluid-port adaptor 38, which is used with syringe adaptor 20, comprises a vial adaptor 39. (Below, either one of the terms “fluid-port adaptor” and “vial adaptor” may be used when referring to vial adaptor 39.) Vial adaptor 39 comprises, at the front of the vial adaptor, a syringe-adaptor connecting portion 40, configured to releasably connect to syringe adaptor 20, and, behind syringe-adaptor connecting portion 40, a vial connecting portion 41, configured to connect to a vial. (Alternatively, it may be said that vial connecting portion 41 is configured to connect to the fluid port of the vial, i.e., the portion of the vial through which fluid flows, such as the top portion or neck portion of the vial.) Typically, vial adaptor 39 further comprises an intermediate portion 78, situated between syringe-adaptor connecting portion 40 and vial connecting portion 41. Intermediate portion 78 provides a passage between syringe-adaptor connecting portion 40 and vial connecting portion 41, such that fluid may flow between the vial and the syringe adaptor.

In other embodiments, as further described below with reference to FIGS. 7A-B and FIGS. 8A-B, fluid-port adaptor 38 may be configured for releasable or non-releasable connection to other types of fluid ports. In such alternate embodiments, the fluid-port adaptor may comprise other types of fluid-port connecting portions, alternatively to vial connecting portion 41.

Syringe-adaptor connecting portion 40 comprises a cylindrical septum housing 43 having an outer surface shaped to define one or more, such as a series of two, three, or more, circumferential (e.g., circular) ridges 44, each of which runs, e.g., in a closed loop, along the circumference of septum housing 43. As further described below, e.g., with reference to FIG. 5D, ridges 44 are configured to releasably connect the vial adaptor to the syringe adaptor by virtue of the teeth that protrude from legs 34 releasably locking onto the ridges. (It is emphasized that ridges 44 are separate from each other, and are thus different from a continuous helical threading.)

It is noted that, in this context, the term “cylindrical” does not indicate that septum housing 43 is necessarily perfectly cylindrical; rather, the shape of septum housing 43 may vary slightly from that of a perfect cylinder. For example, the septum housing may comprise a cylindrical main body, along with one or more protrusions that protrude radially from the main body. In some embodiments, septum housing 43 is not cylindrical at all, but rather, has some other suitable shape.

Syringe-adaptor connecting portion 40 further comprises septum 42, which is disposed at the front opening of septum housing 43 so as to resiliently seal the opening. In some embodiments, septum 42 protrudes from the opening of septum housing 43; in other embodiments, septum 42 does not protrude from the opening.

As shown in the cross-sectional portion of FIG. 1, typically, a distance D2 between successive ones of the ridges is less than one mm. Alternatively or additionally, each of ridges 44 may be angled, rearwardly, away from the opening of the septum housing, i.e., toward intermediate portion 78 and vial connecting portion 41. For example, each ridge may comprise a first ridge-surface 35 that slopes rearwardly and outwardly from the outer surface 31 of the septum housing, and a second ridge-surface 37 that is perpendicular to surface 31 of the septum housing. (In such embodiments, a longitudinal cross-section through the series of ridges 44, as shown in FIG. 1, reveals a sawtooth pattern.) The aforementioned small distance between successive ridges, and/or the aforementioned angling of the ridges, may facilitate the interlocking of the ridges with the teeth on legs 34.

In some embodiments, syringe-adaptor connecting portion 40 is shaped to define a ledge 55, and body 22 is shaped to define a plurality of, such as a pair of, tabs 46, which facilitate the mating of the syringe adaptor with fluid-port adaptor 38 by grasping onto ledge 55, as described below with reference to FIG. 5C. In particular, the grasping of the ledge by tabs 46 prevents septum housing 24 from sliding distally within the body lumen (and hence, from sliding out of the body lumen), e.g., due to a distal pushing force exerted on septum housing 24 by spring 28. Following the transfer of fluid, the user releases tabs 46, and the two adaptors are then uncoupled from one another.

Vial connecting portion 41 comprises a hollow spike 47 that extends rearwardly from intermediate portion 78 or syringe-adaptor connecting portion 40. Typically, spike 47 is parallel to a (hypothetical) vector 53 that is normal to the opening of the septum housing. Spike 47 is configured to couple vial adaptor 39 to a vial, by piercing a vial closure (e.g., another septum) disposed at an opening of the vial. Syringe-adaptor connecting portion 40 and vial connecting portion 41 are collectively shaped to define a passage 49 extending from spike 47 to the opening of septum housing 43, so as to allow fluid flow between the spike and the opening of the septum housing. For example, as shown in FIG. 1, a straight passage 49 may extend from the aperture 92 at the rear end of spike 47 through the length of the spike, through intermediate portion 78, and through syringe-adaptor connecting portion 40. Hence, following the connection of the vial adaptor to the vial (via vial connecting portion 41)

and to the syringe adaptor (via syringe-adaptor connecting portion 40), fluid may be transferred to or from the vial via passage 49.

In some embodiments, vial connecting portion 41 further comprises a circumferential arrangement of leaves 51, which typically extend rearwardly from intermediate portion 78, surrounding spike 47. Leaves 51 are configured to connect (typically, non-releasably) the vial adaptor to the vial by grasping the vial, thus inhibiting an accidental release of the vial adaptor from the vial during a mixing operation.

The Syringe Adaptor

Reference is now made to FIG. 2, which shows a schematic exploded view of syringe adaptor 20, and to FIG. 3, which is a schematic illustration of septum housing 24 holding septum 26, in accordance with some embodiments of the present invention.

In the particular embodiment shown in FIG. 2, septum housing 24 comprises a distal piece 24*a* and a proximal piece 24*b*. To mount septum 26 within the septum housing, a proximal portion 26*c* of the septum is inserted into a distally-protruding tubular section 25 of proximal piece 24*b*, and tubular section 25, along with the septum, is then inserted into distal piece 24*a*. Alternatively, the septum may be first inserted into distal piece 24*a*, and tubular section 25 may then be passed over the septum and into the distal piece. In either case, by inserting tubular section 25 into distal piece 24*a*, the distal piece becomes coupled to proximal piece 24*b*.

Further to the insertion of tubular section 25 into distal piece 24*a*, the coupling between distal piece 24*a* and proximal piece 24*b* may be maintained by any suitable mechanism. For example, the two pieces may be non-releasably connected to one another, e.g., by welding or gluing the two pieces together. Alternatively, the two pieces may be releasably connected to one another. For example, the distal piece may comprise proximally-protruding tabs 27, the proximal ends of which lock into corresponding apertures in the head 29 of proximal piece 24*b* that is proximal to tubular section 25. Alternatively, the two pieces may be connected by a snap connection, threaded connection, force-fit connection, or any other suitable type of connection.

Following the mounting of septum 26 into septum housing 24, a distal portion 26*a* of the septum emerges from an aperture in distal piece 24*a*, as shown in FIG. 3. During the coupling of the syringe adaptor to the fluid-port adaptor, and while the two adaptors remain coupled to one another, portion 26*a* (and in particular, the distal face of portion 26*a*) is in contact with septum 42 of the fluid-port adaptor (FIG. 1). In some embodiments, as shown in FIG. 2, a middle portion 26*b* of the septum has an expanded diameter that is larger than the diameter of the aperture in distal piece 24*a*, such that the septum does not slip through this aperture.

In other embodiments, septum housing 24 does not comprise separate proximal and distal pieces; rather, septum housing 24 comprises a single, integrated piece having proximal and distal portions. Alternatively or additionally, instead of a single septum, the syringe adaptor may comprise two septa, one of these septa being disposed near the proximal end of the septum housing, and the other of these septa being disposed near the distal end of the septum housing.

The septum housing, along with septum 26 mounted therein, is inserted into body 22, such that legs 34 are positioned within the distal portion of the body lumen. Septum housing 24 is configured to slide longitudinally within the lumen of body 22, such sliding facilitating the coupling of the syringe adaptor with the fluid-port adaptor, and the subsequent uncoupling of the two adaptors from one another.

Additionally, syringe fitting 30 is coupled to the proximal end of body 22, such that needle 32 passes through an aperture in head 29 and into septum 26. While the syringe adaptor is not coupled to the fluid-port adaptor, the distal end of needle 32 (or at least the distal opening of the needle, which may be located at any portion of the distal end), is typically positioned within a cavity of septum 26, as further described below with reference to FIG. 6. Alternatively, if syringe adaptor comprises two septa, the distal end of needle 32 (or at least the distal opening of the needle) may be positioned between these two septa.

As previously described with reference to FIG. 1, septum housing 24 comprises a plurality of distally-extending, radially-flexible legs 34. (For example, as shown, distal piece 24*a* may comprise legs 34.) Each of legs 34 is shaped to define one or more, such as a series of two, three, or more, teeth 36, which protrude radially inward from the legs. Typically, as shown, each tooth 36 is angled in the proximal direction, such that the tooth protrudes both radially inward and in the proximal direction. (As described above for ridges 44, the series of teeth may thus define a sawtooth pattern, when viewed in cross-section.) Alternatively or additionally, the distance D1 between successive ones of the teeth may be less than one mm. One or both of these properties may facilitate the interlocking of teeth 36 with ridges 44 (FIG. 1).

Figure 4:
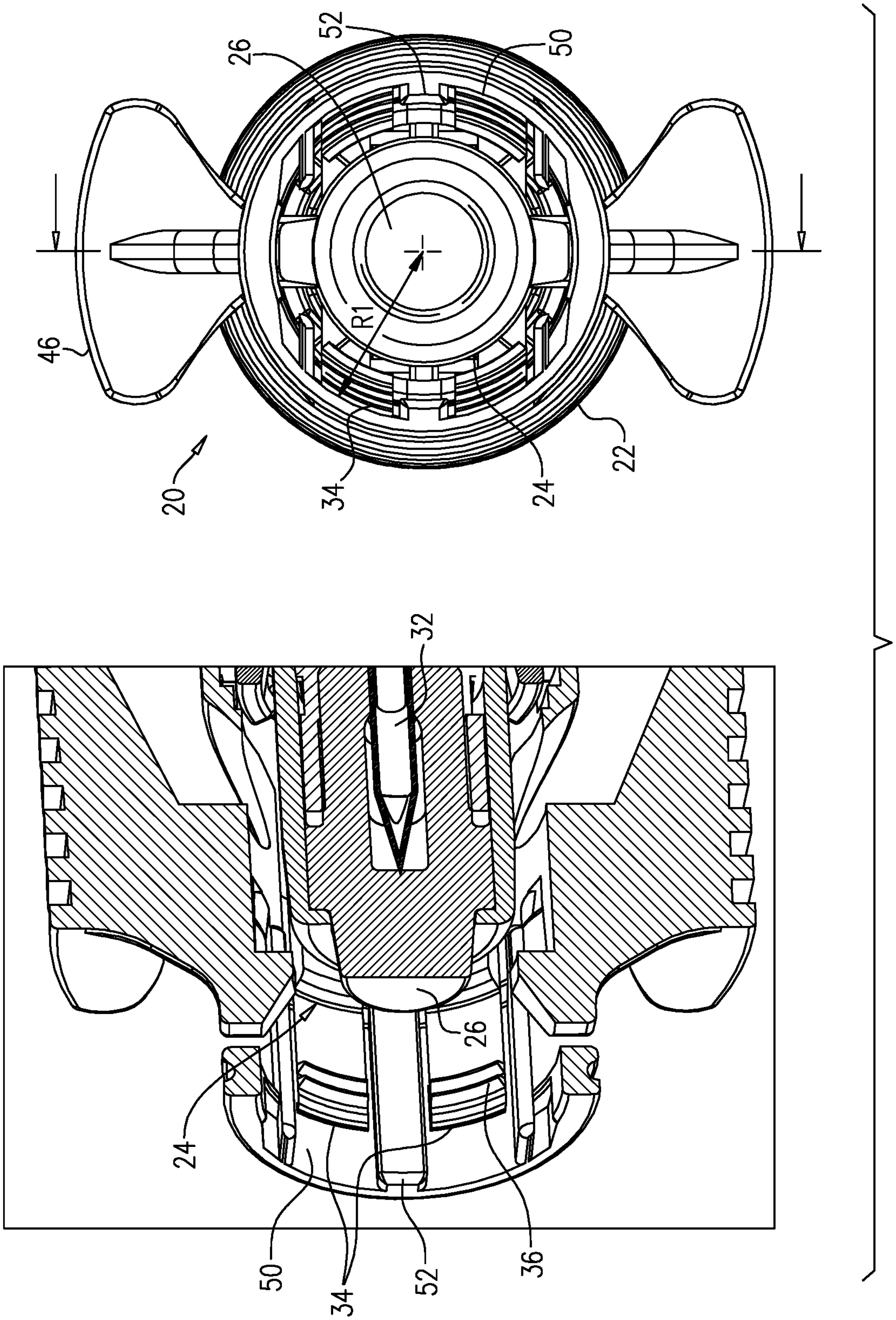
FIG. 4 is a schematic illustration of a distal portion of a syringe adaptor, in accordance with some embodiments of the present invention.

Reference is now made to FIG. 4, which is a schematic illustration of the distal portion of syringe adaptor 20, in accordance with some embodiments of the present invention. The right side of FIG. 4 shows a head-on view of the distal portion of the syringe adaptor, while the left side of FIG. 4 shows a corresponding longitudinal cross-section through the distal portion of the syringe adaptor.

Typically, the lumen of body 22 has a circular transverse cross-section, such that the lumen may accommodate the cylindrical septum housing of the fluid-port adaptor. As noted above, however, the shape of the septum housing of the fluid-port adaptor may differ from that of a perfect cylinder, e.g., by virtue of the septum housing comprising one or more radial protrusions; consequently, the cross-sectional shape of the lumen may also differ from a perfect circle at one or more locations along the longitudinal axis of body 22, such as to accommodate these protrusions. Moreover, as further described below, grooves may be formed in at least part of the inside wall of body 22, such that the cross-sectional shape of at least part of the lumen might not be perfectly circular.

Typically, the lumen of body 22 has a variable radius that is larger at the distal portion of the lumen than at a more proximal portion of the lumen. While the syringe adaptor is not coupled to the fluid-port adaptor, legs 34 are positioned inside the distal portion of the body lumen, such that legs 34 are free to expand radially outward to a radially-expanded position. Subsequently, as described below with reference to FIG. 5B, during the mating of the two adaptors, septum housing 24 is pushed toward the proximal end of body 22. As the septum housing is proximally pushed, legs 34 are forced into the smaller-radius, more proximal portion of the body lumen, such that the legs are forced radially inward, and therefore engage ridges 44 (FIG. 1) of the fluid-port adaptor.

While legs 34 are positioned inside the distal portion of the body lumen, the distal opening of the needle is disposed proximally to at least the distal face of septum 26. For example, as described above with reference to FIG. 2 and shown in FIG. 4, the distal opening of the needle may be disposed inside of the septum. In contrast, when the legs are inside at least part of the more proximal portion of the body lumen, the distal opening of the needle is disposed distally to the distal face of the septum.

In some embodiments, the distal portion of the inside wall of body 22 is shaped to define a plurality of grooves 50, such that the radius of the body lumen is larger at the distal portion of the body lumen by virtue of the grooves. For example, in FIG. 4, grooves 50 are at a radius R1, i.e., a distance R1 from the center of the body lumen, while portions 52 of the inside wall of body 22 lying between the grooves, along with the more proximal portion of the inside wall that is not shaped to define any grooves, are at a radius that is smaller than R1. The septum housing is inserted into the body lumen with legs 34 being aligned with grooves 50, such that, when positioned within the distal portion of the body lumen, legs 34 expand into the grooves. As the septum housing is pushed proximally, the legs are forced out of the grooves, and hence contract radially inward.

In some embodiments, grooves 50 extend into the more proximal portion of body 22, but are deeper in the distal portion of body 22 than in the more proximal portion of the body. In other words, in some embodiments, the inside wall of body 22 is shaped to define a plurality of grooves 50 having a variable depth that is larger at the distal portion of the inside wall than at the more proximal portion of the inside wall. (The depth of the grooves may change continuously or discretely. As an example of the latter, the depth may have exactly two values: a first, larger value in the distal portion of the inside wall, and a second, smaller value in the more proximal portion of the inside wall.) The radius of the body lumen is thus larger at the distal portion of the body lumen by virtue of the variable depth of the grooves. An advantage of such embodiments is that it may be easier to properly align the septum housing within the body lumen, given that the legs of the septum housing may be disposed within the grooves even when the septum housing is in the more proximal portion of the body lumen.

Coupling the Adaptors to One Another

Reference is now made to FIGS. 5A-D, which are schematic illustrations collectively showing the coupling of syringe adaptor 20 with fluid-port adaptor 38, in accordance with some embodiments of the present invention.

Figure 5A:
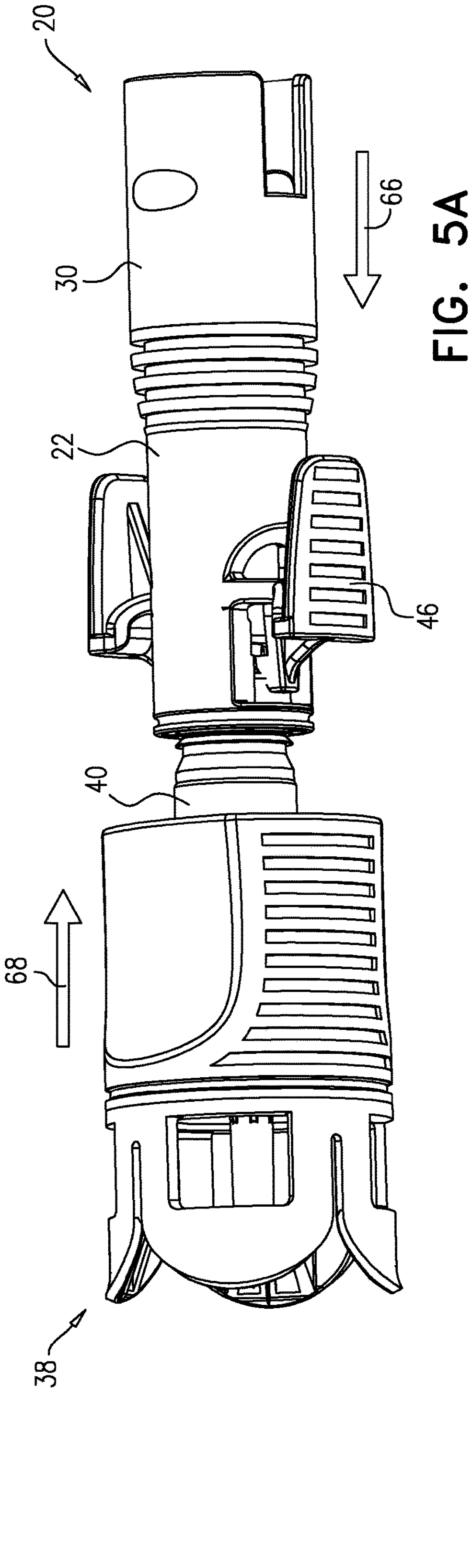
FIGS. 5A-D are schematic illustrations collectively showing the coupling of a syringe adaptor with a fluid-port adaptor, in accordance with some embodiments of the present invention.

FIG. 5A shows the beginning of the coupling process, whereby septum housing 43 enters the body lumen of the syringe adaptor. Typically, prior to the beginning of the coupling process as depicted in FIG. 5A, the fluid-port adaptor is connected to a fluid port (such as a vial), and the syringe adaptor is connected to a syringe.

As indicated by a leftward-pointing arrow 66, the entrance of septum housing 43 into the body lumen may be effected by passing body 22 over syringe-adaptor connecting portion 40 while the position of the fluid-port adaptor remains fixed. For example, if fluid-port adaptor 38 is coupled to a vial that sits on a horizontal surface (such that syringe-adaptor connecting portion 40 points vertically upward), the syringe adaptor may be pushed downward, such that body 22 passes over syringe-adaptor connecting portion 40. Alternatively, as indicated by a rightward-pointing arrow 68, septum housing 43 may be inserted into body 22, while the position of the syringe adaptor remains fixed. Alternatively, both the syringe adaptor and the fluid-port adaptor may be moved towards one another.

Figure 5B:
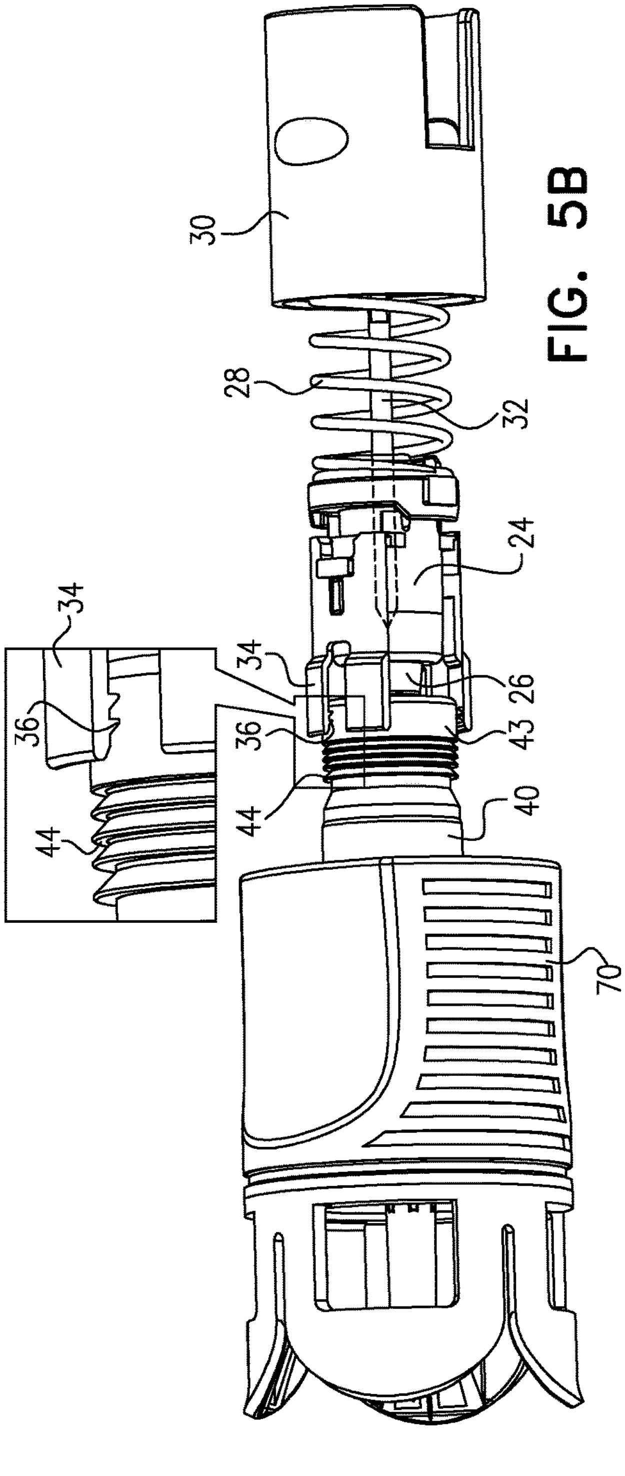

FIG. 5B shows the same scenario shown in FIG. 5A. In FIG. 5B, however, body 22 is hidden, such as to show the various elements of syringe adaptor 20 contained within the body lumen. It is thus shown that in this initial configuration of the syringe adaptor, prior to any proximal pushing of septum housing 24, legs are poised over septum housing 43 in a radially-expanded configuration, the distal end of needle 32 is contained within septum 26, and spring 28—which, as shown in FIG. 5B, may extend all the way from syringe fitting 30 to septum housing 24—is typically uncompressed, or is minimally compressed.

As the insertion of syringe-adaptor connecting portion 40 (via movement of the syringe adaptor toward the fluid adaptor, and/or movement of the fluid-port adaptor toward the syringe adaptor) into body 22 continues, septum 42 of the fluid-port adaptor, which is disposed at the opening of septum housing 43, comes into contact with the distal face of septum 26, and the fluid-port adaptor then pushes septum housing 24 proximally, i.e., towards syringe fitting 30, within the body lumen. As septum housing 24 is proximally pushed, legs 34 enter the narrower portion of the body lumen, such that the legs are pushed radially inward.

As the fluid-port adaptor continues to proximally push septum housing 24, spring 28 facilitates the locking of teeth 36 onto ridges 44 by biasing the septum housing distally. In particular, as spring 28 is compressed, spring 28 exerts a distal counterforce (i.e., a force that counters the proximal force exerted by the fluid-port adaptor) on septum housing 24. This counterforce causes teeth to slide distally over ridges 44, while septum 26 of the syringe adaptor and septum 42 of the fluid-port adaptor, by virtue of their compressibility, are pressed tightly together. A tight seal between the two septa is thus created, such as to inhibit any leakage of fluid.

It is noted that an advantage of having multiple ridges on septum housing 43 and/or multiple teeth on each leg 34 is that a tight seal between septum 26 and septum 42 may be obtained for various septum sizes, shapes, and compressibilities. In other words, due to the presence of multiple ridges and/or multiple teeth, it is likely that at least one tooth and one ridge will interlock with one another when the septa are pressed tightly together. On the other hand, if there were only a single tooth per leg 34 and a single ridge on septum housing 43, the single tooth might not reach the single ridge if septum 26 were to protrude a large distance from the distal aperture in septum housing 24 and septum 26 were not sufficiently compressible; conversely, if septum 26 were to protrude only a short distance and/or septum 26 were sufficiently compressible, a tight seal between the septa might not be attainable.

In some embodiments, syringe adaptor 20 does not comprise spring 28. In such embodiments, teeth 36 do not slide along ridges 44; rather, upon legs 34 entering the narrower portion of the body lumen, the legs close over the ridges, and then remain locked in place, i.e., each tooth that interlocks with a particular one of the ridges remains interlocked with that ridge. (Even in such embodiments, it is advantageous to have multiple ridges and/or multiple teeth per leg, in that having multiple ridges and/or multiple teeth facilitates using system 21 with various septum sizes and shapes.)

Figure 5C:
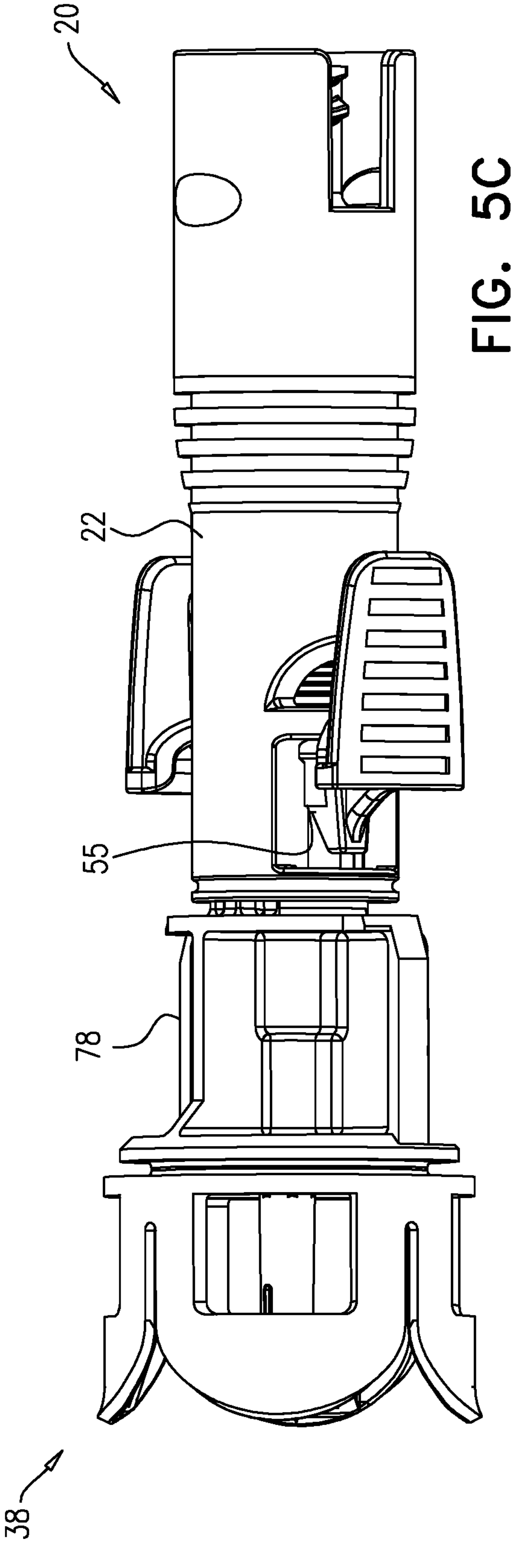

FIG. 5C shows the syringe adaptor and fluid-port adaptor coupled to one another. For clarity, an outer portion 70 of intermediate portion 78 is hidden, such as to reveal ledge 55, which is typically located behind the ridges. Ledge 55 is configured to receive tabs 46 during the connection of the vial adaptor to the syringe adaptor. In particular, upon septum housing 43 being sufficiently advanced within the body lumen, tabs 46 lock onto ledge 55, thus helping to prevent septum housing 24 and septum housing 43 from sliding distally within the body lumen. (It is noted that septum housing 43 may continue to be advanced, even after tabs 46 lock onto ledge 55. Such further advancement may cause teeth 36 to continue to slide distally along ridges 44, thus creating a tighter seal between the two septa.)

Figure 5D:
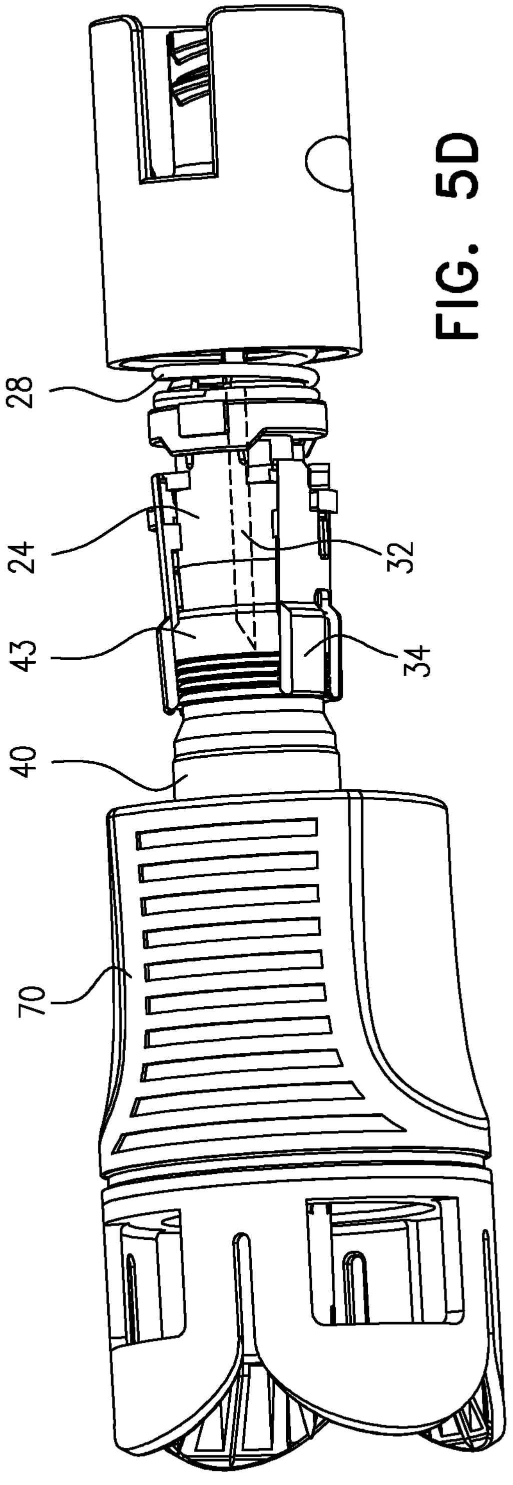

FIG. 5D shows the same scenario shown in FIG. 5C. In FIG. 5D, however, portion 70 is shown, and body 22 is not shown, such that teeth 36 are shown releasably locked onto the ridges. (It is noted that even after the user ceases to push the two adaptors together, the teeth do not slide proximally over the ridges; rather, the teeth remain locked onto the ridges, as long as legs 34 remain within the narrower, more proximal portion of body 22.) As a further result of the proximal movement of septum housing 43 and septum housing 24 within the body lumen, needle 32 passes through both septa, such that the distal opening of the needle is disposed within, or beyond, septum housing 43, and within passage 49 (FIG. 1).

Following the transfer of fluid via the needle, tabs 46 are released from ledge 55, such that spring 28 expands, thus distally pushing septum housing 24. Alternatively or additionally, the two adaptors may be pulled away from one another, such that septum housing 43 distally pulls septum housing 24 through the body lumen. In any case, upon legs 34 entering the wider, distal portion of the body lumen from the more proximal portion of the body lumen, the legs expand radially outward, such that the teeth become unlocked from the ridges. The two adaptors may then be fully separated.

The Syringe-Adaptor Septum

Figure 6:
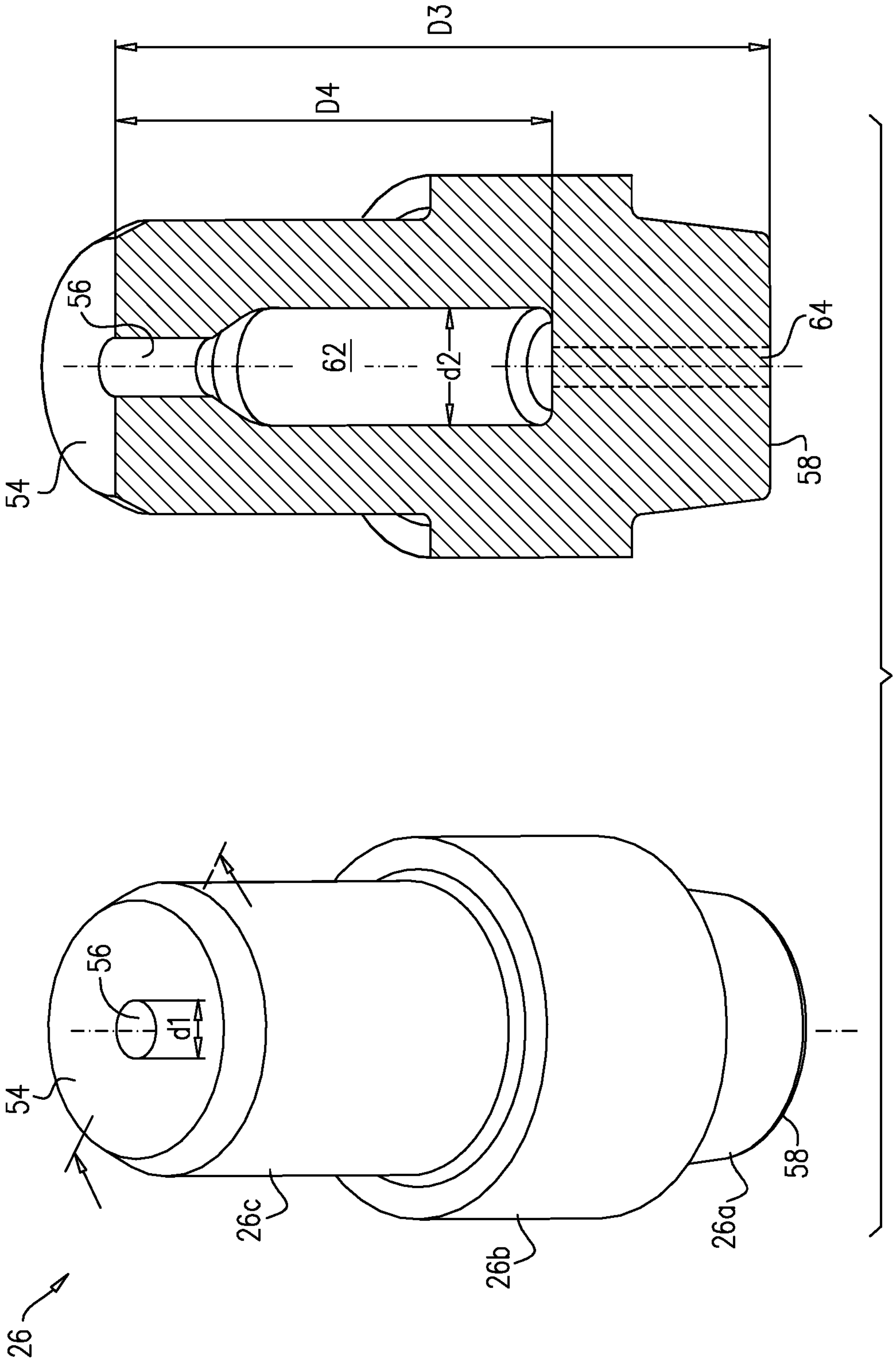
FIG. 6 is a schematic illustration of a septum, in accordance with some embodiments of the present invention.

Reference is now made to FIG. 6, which is a schematic illustration of septum 26, in accordance with some embodiments of the present invention. Septum 26, which was briefly described above with reference to FIG. 2, is described in detail hereinbelow, with reference to FIG. 6.

Septum 26, which may be made of a resilient material such as an elastomer, comprises a proximal face 54, a distal face 58, and a longitudinal body extending between proximal face 54 and distal face 58. For example, as described above with reference to FIG. 2, the longitudinal body of the septum may comprise a proximal portion 26*c*, a wider middle portion 26*b*, and a distal portion 26*a*. Typically, distal face 58 is disposed at least 7 mm from proximal face 54 of the septum, i.e., the distance D3 between the proximal and distal faces of the septum is at least 7 mm. For example, distance D3 may be between 7 and 25 mm, such as between 10 and 20 mm, e.g., 13.5 mm.

Proximal face 54 is shaped to define an aperture 56 having a diameter d1 that is less than the diameter of the distal end of needle 32. For example, since a typical needle diameter is 1.5 mm, diameter d1 may be less than 1.5 mm. Due to the elastomeric properties of the septum, upon the needle passing through the aperture, the needle forces the aperture to expand to a diameter that is just large enough to accommodate the needle. The septum thus fittingly slides over the needle, and, subsequently to the sliding of the septum, proximal face 54 continues to press against the needle. There is thus little risk of any fluid escaping through the aperture.

Septum 26 is shaped to define a cavity 62 that is joined to aperture 56. Typically, cavity 62 is relatively long; for example, the cavity may extend at least 5 mm from the proximal face of the septum, i.e., the distance D4 between proximal face 54 and the distal end of the cavity may be at least 5 mm. For example, distance D4 may be between 5 and 15 mm, such as 9 mm. The relatively large length of cavity 62 facilitates housing the distal end of needle 32 while the syringe adaptor is not coupled to the fluid-port adaptor. Advantageously, the diameter d2 of cavity 62 is typically larger than diameter d1 of the aperture; for example, diameter d2 may be greater than 0.8 mm, such as between 1 and 3 mm. (Typically, diameter d2 is 0.3-0.7 mm, such as 0.5 mm, greater than the diameter of the distal end of needle 32; for example, for a needle diameter of 1.5 mm, d2 may be 2 mm.) The relatively large width of cavity 62 generally reduces the friction between the needle and the septum as the needle passes through the septum.

As the septum housing slides proximally within the body lumen of the syringe adaptor during the coupling of the syringe adaptor with the fluid-port adaptor, the distal end of the needle, which was contained heretofore in cavity 62, pierces through a portion of the septum that lies between cavity 62 and distal face 58, thus creating a passage 64 through which the needle passes. Subsequently, fluid is transferred via the needle. Following the transfer of fluid, during the uncoupling of the two adaptors, the septum housing slides distally within the body lumen, such that the distal end of the needle returns to cavity 62. As the needle is withdrawn (via the distal sliding of the septum housing), passage 64 closes due to the elasticity of septum 26, such that the distal end of the needle is sealed within the septum. Typically, the septum provides an airtight seal around the needle opening, such that the user is inhibited from improperly using the syringe while the syringe adaptor is not connected to the fluid port adaptor.

Alternate Fluid-Port Adaptors

The paragraphs below describe various fluid-port adaptors that may be used, alternatively to vial adaptor 39, with syringe adaptor 20. (It is noted that vial adaptor 39 may include any suitable features of these fluid-port adaptors described below, mutatis mutandis.)

Figure 7A:
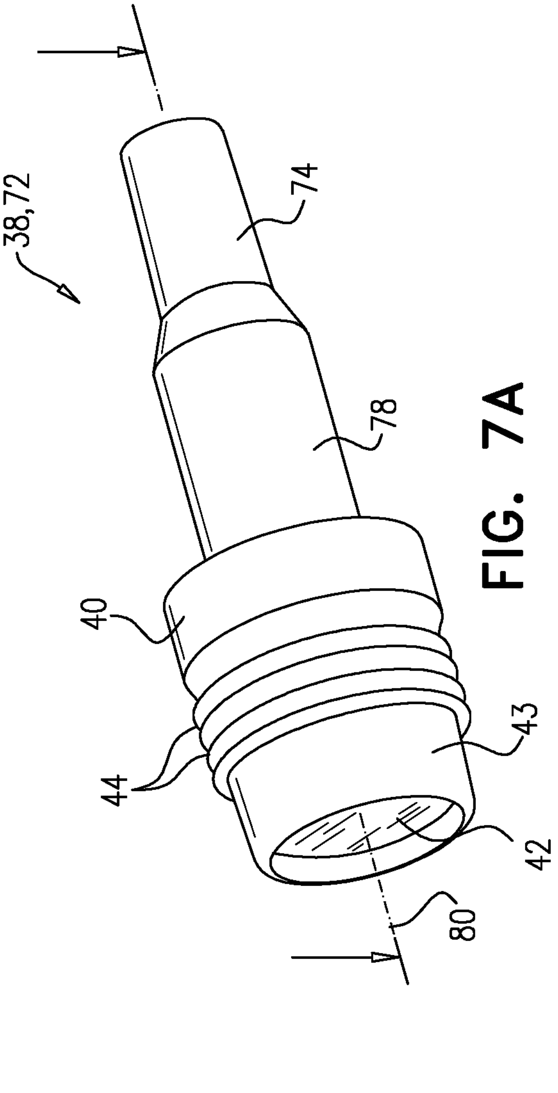
FIGS. 7A-B are schematic illustrations of an infusion-set adaptor, in accordance with some embodiments of the present invention.
Figure 7B:
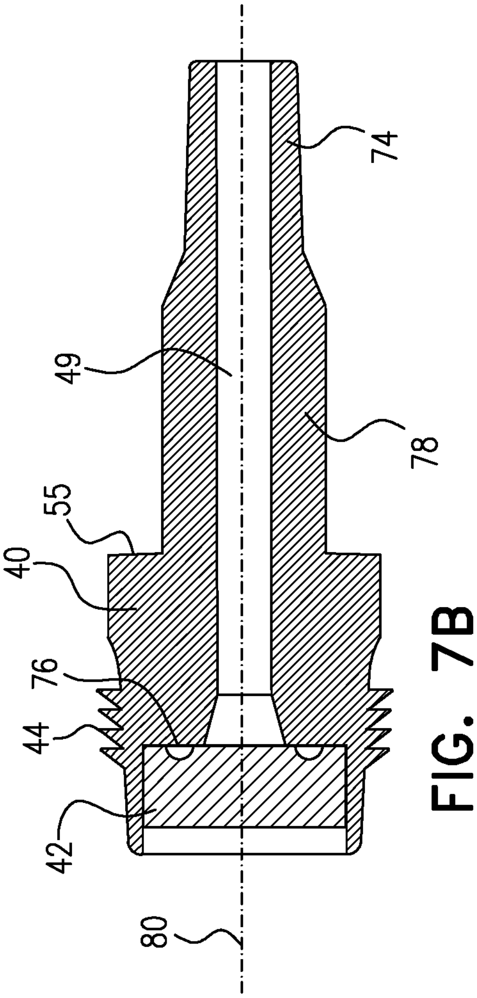

Reference is first made to FIGS. 7A-B, which are schematic illustration of an infusion-set adaptor 72, in accordance with some embodiments of the present invention. FIG. 7B shows a longitudinal cross-section through adaptor 72, taken as indicated in FIG. 7A.

Infusion-set adaptor 72 is similar to vial adaptor 39, in that infusion-set adaptor 72 is configured to couple to syringe adaptor 20, generally as described above with reference to the preceding figures. Infusion-set adaptor 72 differs from vial adaptor 39, however, in that infusion-set adaptor 72 is configured for releasable connection to a fluid port (e.g., a side port) of an intravenous (IV) cannula, e.g., at an injection site, rather than for connection to a vial.

Similarly to vial adaptor 39, infusion-set adaptor 72 comprises, at its front end, syringe-adaptor connecting portion 40, which in turn comprises cylindrical septum housing 43. Septum 42 may be sealingly mounted onto a seat 76 located near the opening of septum housing 43, or alternatively mounted within septum housing 43 in any other suitable manner. The outer surface of septum housing 43 is shaped to define one or more circumferential (e.g., circular) ridges 44, and syringe-adaptor connecting portion 40 may be further shaped to define ledge 55, as described above with reference to the preceding figures.

Unlike vial adaptor 39, however, infusion-set adaptor 72 comprises, at its rear end, a fluid-port connecting portion comprising a cylindrical tube 74. Cylindrical tube 74 is configured to connect infusion-set adaptor 72 to the fluid port of an IV cannula, by passing into or over the fluid port, e.g., as shown in FIG. 29 of U.S. Pat. No. 8,122,923, whose disclosure is incorporated herein by reference.

Typically, a cylindrical intermediate portion 78 is disposed between syringe-adaptor connecting portion 40 and cylindrical tube 74. Passage 49 extends axially through tube 74, intermediate portion 78, and syringe-adaptor connecting portion 40, thus allowing fluid flow through infusion-set adaptor 72 when septum 42 is suitably pierced. In some embodiments, infusion-set adaptor 72 (excluding septum 42) is integrally formed, and is side-to-side symmetric along its central longitudinal axis 80.

Figure 8A:
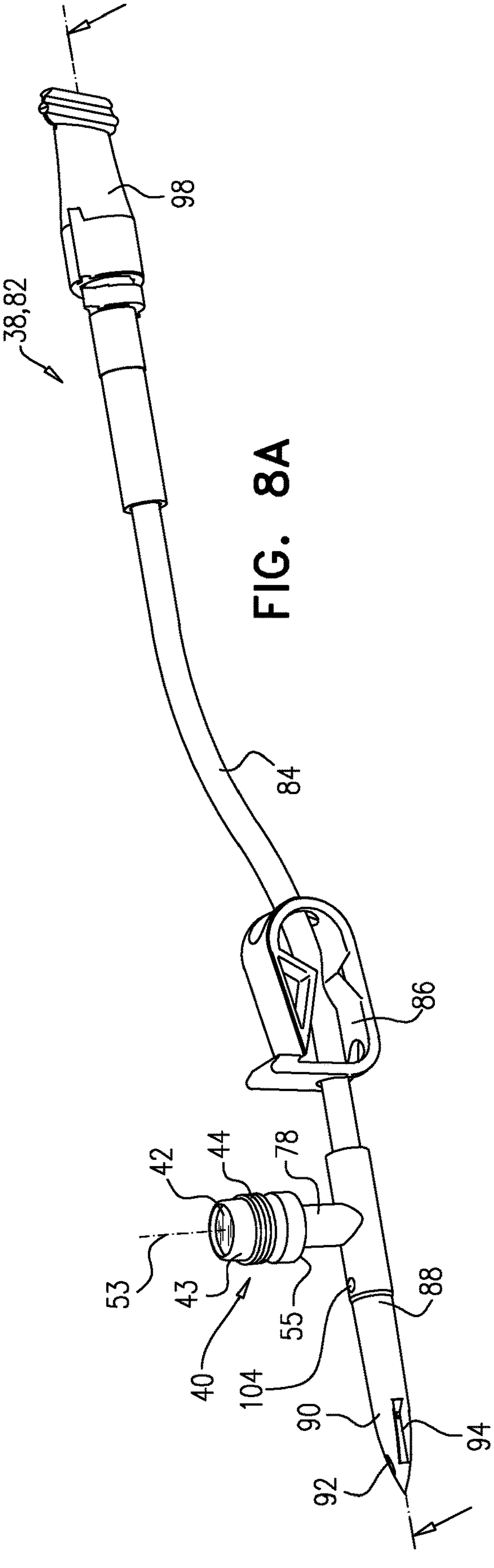
FIGS. 8A-B are schematic illustrations of a spike port adaptor, in accordance with some embodiments of the present invention.
Figure 8B:
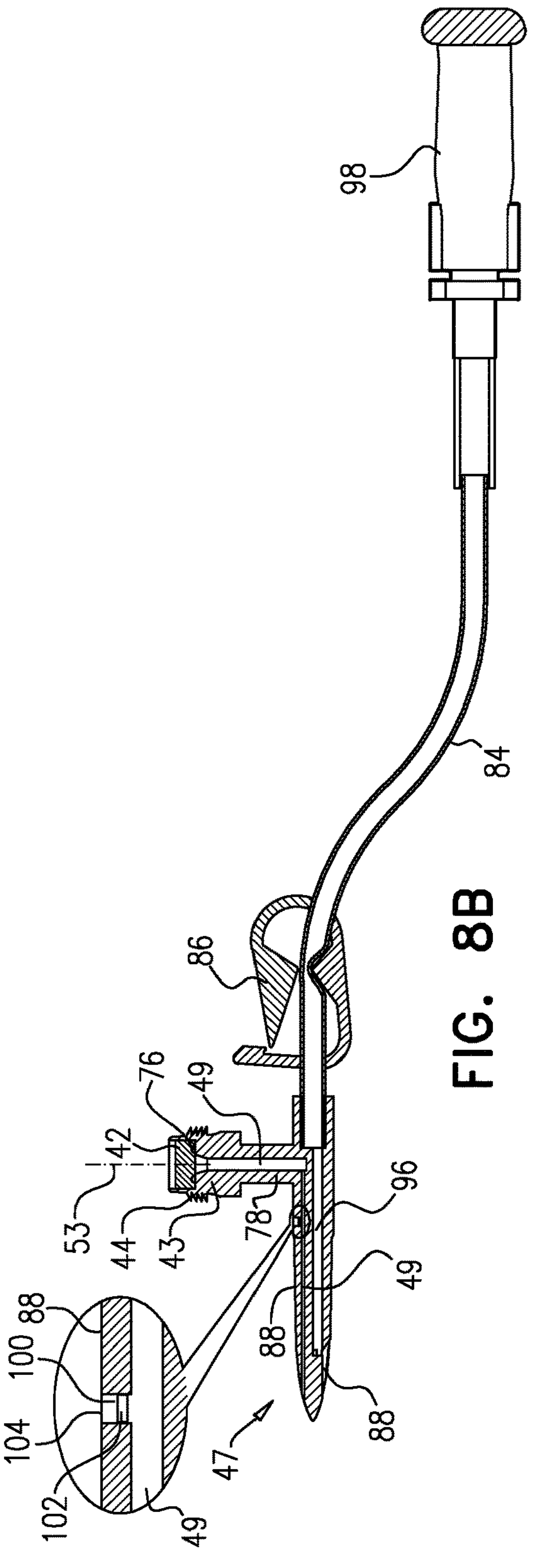

Reference is now made to FIGS. 8A-B, which are schematic illustrations of a spike port adaptor 82, in accordance with some embodiments of the present invention. FIG. 8B shows a longitudinal cross-section through adaptor 82, taken as indicated in FIG. 8A.

Spike port adaptor 82 is similar to vial adaptor 39, in that spike port adaptor 82 is configured to couple to syringe adaptor 20, generally as described above with reference to the preceding figures. Spike port adaptor 82 differs from vial adaptor 39, however, in that spike port adaptor 82 is configured for releasable connection to a fluid port of an IV bag (or "receptacle"). One commercial product that may be modified to embody spike port adaptor 82 is the Tevadaptor® Spike Port Adaptor.

Similarly to vial adaptor 39, spike port adaptor 82 comprises syringe-adaptor connecting portion 40, which comprises cylindrical septum housing 43 shaped to define a plurality of ridges 44, along with an intermediate portion 78 and a fluid-port connecting portion comprising hollow spike 47. In spike port adaptor 82, however, spike 47 extends obliquely to, or perpendicularly to, vector 53, which is normal to the opening of the septum housing. Spike 47 connects the spike port adaptor to a fluid port of an IV bag, by piercing a closure disposed at the opening of the fluid port, as shown, for example, in FIG. 20 of U.S. Pat. No. 8,122,923, whose disclosure is incorporated herein by reference.

Typically, spike 47 is formed of plastic. Spike 47 comprises a main body portion 88, which is shaped to define a tapered end 90. In some embodiments, the outer surface of main body portion 88 includes one or more finger grip surfaces (not shown). To further facilitate the gripping of the main body portion, the outer surface of the main body portion may be shaped to define a plurality of bumps or other protrusions, and/or may be coated with a coarse, grip-enhancing coating.

In some embodiments, tapered end 90 is shaped to define two apertures: a first aperture 92, which communicates with passage 49 (which extends, e.g., in an L-shape, from first aperture 92 to the opening of septum housing 43), and a second aperture 94, which communicates with a second passage 96, which in turn communicates with the lumen of a hollow flexible tube 84 (described below). In some embodiments, passage 49 includes a side passage 100, which terminates at a third aperture 104. Side passage 100 may be positioned, for example, within tapered end 90, or between tapered end 90 and syringe-adaptor connecting portion 40. In such embodiments, air may flow out of passage 49 via side passage 100 and third aperture 104. Side passage 100 may be provided with a check valve 102, which enforces a unidirectional, inward flow of air therethrough. In particular, as fluid is drawn from the IV bag via spike 47, air from the ambient environment passes through check valve 102, through passage 49, and into the IV bag. In some embodiments, a hydrophobic membrane, which allows the flow of air therethrough but inhibits the flow of fluid therethrough, is positioned within side passage 100, e.g., adjacent to check valve 102.

Tube 84, which is typically formed from plastic, is typically coupled to a standard clamp 86, which is commercially available from various manufacturers, such as Qosina of Italy. Tube 84 is coupled, at its front end, to intermediate portion 78 or to main body portion 88 of spike 47, such that the lumen of tube 84 is in fluid communication with second passage 96 (as shown in FIG. 8B) or with passage 49.

Typically, a sealing assembly 98 is attached to the rear end of tube 84. Sealing assembly 98 is configured to seal tube 84 during use of the drug mixing device, and may be removed from tube 84 when the IV bag is connected directly to an infusion set spike for infusion of the fluid contained therein to a patient.

In some embodiments, instead of spike port adaptor 82 comprising tube 84, intermediate portion 78 or main body portion 88 may be shaped to define an outlet port configured to receive another spike element. Such an outlet port may, for example, be formed from an elastomeric element attached to intermediate portion 78 or main body portion 88. A separate tube, having another spike disposed at its front end, may then be inserted into the outlet port, such as to establish fluid communication between the tube and passage 49 and/or second passage 96.

More generally, the scope of the present invention includes fluid-port adaptors configured for connection to any suitable types of fluid ports, by virtue of comprising any suitable types of fluid-port connectors. For example, a fluid-port connector may comprise a hollow male or female threaded extension that may be screwed into, or over, a corresponding threaded fluid port of a fluid container.

It will be appreciated by persons skilled in the art that the present invention is not limited to what has been particularly shown and described hereinabove. Rather, the scope of embodiments of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A syringe adaptor, comprising:
- a body, shaped to define a body lumen;
- a syringe fitting at a proximal end of the body, configured to connect to a distal end of a syringe;
- a single needle extending distally from the syringe fitting into the body lumen;
- a septum housing; and
- an elastomeric septum mounted inside the septum housing, the septum comprising:
  - a proximal face, shaped to define an aperture having an aperture diameter; and
  - a distal face,
  - the septum being shaped to define a cavity, joined to the aperture, having a cavity diameter that is larger than the aperture diameter, the septum housing being configured to slide proximally within the body lumen such that a distal end of only the single needle contained in the cavity passes through the distal face of the septum, wherein the septum housing and the body are configured such that the proximal sliding alone causes the distal end of the needle to pierce the distal face of the septum, without requiring engagement or actuation of a separate latch member.

2. The syringe adaptor according to claim 1, wherein the cavity extends at least 5 mm from the proximal face of the septum.

3. The syringe adaptor according to claim 1, wherein the distal face of the septum is disposed at least 7 mm from the proximal face of the septum.

4. The syringe adaptor according to claim 1, wherein the aperture diameter is less than 1.5 mm.

5. The syringe adaptor according to claim 1, wherein the cavity diameter is greater than 0.8 mm.

6. The syringe adaptor according to claim 1, wherein the cavity diameter is 0.3-0.7 mm greater than a needle diameter of the single needle.

7. The syringe adaptor according to claim 1, wherein the septum has a proximal portion, a distal portion that can pass through an aperture in the septum housing, and a middle portion having a diameter larger than a diameter of the aperture in the septum housing.

* * * * *